United States Patent

Grosspietsch et al.

[11] Patent Number: 5,860,502
[45] Date of Patent: Jan. 19, 1999

[54] HYDRAULICALLY OPERATED CLUTCH ASSEMBLY FOR A MOTOR VEHICLE HAVING A DETACHABLE PLUG-TYPE CONNECTOR

[75] Inventors: Wolfgang Grosspietsch; Volker Stampf, both of Schweinfurt; Alfred Eusemann, Bergrheinfeld; Thomas Riess, Mürsbach, all of Germany

[73] Assignee: Fichtel & Sachs AG, Schweinfurt, Germany

[21] Appl. No.: 816,847

[22] Filed: Mar. 13, 1997

[30] Foreign Application Priority Data

Mar. 14, 1996 [DE] Germany ............... 196 09 925.0

[51] Int. Cl.⁶ ............................................. F16L 21/02
[52] U.S. Cl. ................ 192/85 C; 192/91 R; 285/321; 92/128
[58] Field of Search ............. 192/85 C, 91 R, 192/85 R; 285/305, 321, 256; 92/128; 60/533, 584

[56] References Cited

U.S. PATENT DOCUMENTS

| | | |
|---|---|---|
| 3,333,665 | 8/1967 | Einchomb et al. . |
| 3,430,744 | 3/1969 | Oguri . |
| 4,526,411 | 7/1985 | Bartholomew . |
| 4,665,802 | 5/1987 | Barker et al. . |
| 4,998,609 | 3/1991 | Nix et al. . |
| 5,273,323 | 12/1993 | Calmettes et al. . |
| 5,350,203 | 9/1994 | McNaughton et al. ............ 285/305 X |
| 5,423,577 | 6/1995 | Ketcham . |
| 5,472,242 | 12/1995 | Petersen . |
| 5,492,374 | 2/1996 | Sauer et al. ............................ 285/305 |
| 5,538,297 | 7/1996 | Mc Naughton et al. ........... 285/305 X |
| 5,542,716 | 8/1996 | Szabo et al. ............................ 285/305 |
| 5,653,475 | 8/1997 | Scheying et al. ................... 285/305 X |

FOREIGN PATENT DOCUMENTS

| | | |
|---|---|---|
| 0530778 | 3/1993 | European Pat. Off. . |
| 1289274 | 2/1962 | France . |
| 3730727 | 3/1989 | Germany . |
| 4219235 | 9/1993 | Germany . |
| 4404731 | 8/1995 | Germany . |
| 2087021 | 5/1982 | United Kingdom . |

OTHER PUBLICATIONS

U.S. Ser. No. 08/389,012, Wolfgang Grosspietsch et al., filed Feb. 1995,

Primary Examiner—Charles A. Marmor
Assistant Examiner—Saúl J. Rodriguez
Attorney, Agent, or Firm—Nils H. Ljungman and Associates

[57] ABSTRACT

A detachable plug-type connector, in particular for the connection of a pressure line to a hydraulic cylinder with a pin-shaped inner part, which pin-shaped inner part can be inserted in a boring of an outer part. Between the outer part and the inner part there is a seal. The seal sits in the boring of the outer part, and in front of the seal there is a securing element which limits the axial travel of the seal in the extraction direction.

16 Claims, 9 Drawing Sheets

HYDRAULICALLY OPERATED CLUTCH ASSEMBLY FOR A MOTOR VEHICLE HAVING A DETACHABLE PLUG-TYPE CONNECTOR

BACKGROUND OF THE INVENTION

1. Field of the Invention

This invention generally relates to a detachable plug-type connector for hydraulic systems, in particular for motor vehicles, for the connection of a pressure line to a hydraulic cylinder. The plug-type connector has a pin-shaped inner part which can be inserted into a boring of an outer part, whereby a seal is provided between the outer part and the inner part.

2. Background Information

Such a plug-type connector is disclosed, for example, in German Patent No. 44 04 731. The outer part is a part of a housing of the hydraulic cylinder. The seal is realized in the form of an O-ring which sits in a groove on the pin-shaped inner part or plug. The inner part is enlarged conically in its rear area. The guidance and the firm seating of the inner part in the stepped boring of the outer part are ensured by the enlarged outer surface and the front end, which has a smaller diameter. There is a support element between the seal and the conical enlargement of the inner part. A securing element which is realized in the form of a spring clip sits in slots which run diametrically opposite to one another in the outer part, and the spring clip serves to reduce the inside diameter of the boring. During installation, the inner part is introduced into the outer part and thus also into the spring clip. The spring clip is thereby expanded by the cone of the inner part. As the inner part is pushed further into the outer part, the spring clip arrives in the area of the securing element, which is formed by a significantly reduced outside diameter on the inner part (for example, a groove or a shoulder), and snaps in place as a result of the spring bias. It is then no longer possible to extract the inner part from the outer part.

For disassembly, the spring clip is pulled out of the slot, and the seal is removed from the plug-type connection along with the inner part. One disadvantage of this procedure is that when the plug-type connection is removed, the seal can become dirty or damaged, and when the seal is reinstalled at some later point it may no longer perform an ideal sealing action. It is also possible that the seal will be lost during this disassembly procedure. Significant disadvantages can also occur if, when the plug-type connection is detached, the seal comes into contact with petroleum products, for example, in particular if the hydraulic cylinder in question is a brake cylinder. Seals which are resistant to brake fluid are not resistant to petroleum and vice-versa. The gasket will consequently swell up and cease to perform its function. In the case cited by way of example, that would entail significant risks.

During assembly, the spring clip already sits in its securing position in the slots in the outer part, to clearly indicate to the mechanic by the locking of the inner part that the plug-type connection has been correctly made. If, as the inner part (the plug) is being introduced, the procedure is not performed extremely carefully, e.g. if the plug is introduced at an angle, the seal can be damaged when it comes into contact with the circlip or sealing ring, which can also have an undesirable affect on the operation of the hydraulic cylinder.

OBJECT OF THE INVENTION

The object of the invention is to improve a generic plug-type connector to prevent damage to the seal when the plug-type connector is detached.

SUMMARY OF THE INVENTION

The present invention teaches that the seal can sit in the boring of the outer part, and in front of the seal there is a securing element which limits the axial travel of the seal in the direction of extraction.

As a result of the location of the seal in the outer part it is possible to install the seal so that when the plug-type connector is detached, the seal remains on its seat. Inside the housing, the seal is protected against damage and dirt. As a result of the securing element which restricts the axial travel of the seal in the direction of extraction, a captive seal is created. The seal cannot fall out of the outer part, either during the extraction of the inner part from the boring, during any transport of the outer part, or through an opening located in the direction of gravity.

To install the seal in the insertion direction of the inner part, the inner part preferably comes into contact with a radial shoulder in the outer part in the axial direction.

In other words, and in accordance with one embodiment, to install the seal in the insertion direction of the inner part, the seal preferably comes into contact with a radial shoulder in the outer part in the axial direction.

The securing element can preferably be in the form of a ring which has at least two diametrically oriented radial hooks or two hooks located diametrically opposite one another. The radial hooks are preferably realized so that they are flexible, and the securing element is preferably made of plastic. When the securing element is introduced into the boring in the outer part, the radial hooks are supported on the wall of the boring and form a tight hold. The outer part can also be made of plastic, in accordance with one embodiment, so that the hooks are firmly connected to the wall, to achieve a secure seating of the securing ring.

It is particularly advantageous if the boring has an encircling inner groove (a turned groove or one produced by a similar process), in which the radial hooks can be engaged.

In one particularly preferred embodiment, the outer part is provided with a slot which intersects or divides the boring, into which slot the radial hooks can be snapped. Such a slot can perform the function of an inner peripheral groove, but the slot may be easier to realize than such a groove in terms of manufacturing technology. In particular, it may not be feasible to introduce, into an outer part which is realized in the form of an injection molded plastic part, an inner peripheral groove because the component may not be deformable or can only be deformed to an insufficient extent, and thus correspondingly complex and expensive tooling is required.

The ring is also preferably provided in front of the radial hooks with an inner cone. This inner cone makes it possible to center the inner part on or through the circlip or securing element during the assembly of the plug-type connector. The forward end of the inner part can therefore have a diameter which is significantly smaller than the inside diameter of the seal, because the forward part of the inner part is no longer required to perform any centering function. Any burrs or other damage to the surface can therefore not damage the seal element when the inner part is inserted. The inner cone preferably ends at the level of the axial shoulder which is realized on the radial hooks.

In accordance with one embodiment, if the outer part is provided with a peripheral groove in the boring, the ring can also have four radial hooks which are distributed uniformly over the periphery of the ring.

The securing element, in accordance with one embodiment, can be made of metal and can be formed by a slotted ring, whereby an elasticity can be provided in the radial direction. The ring can also have an outer cone to facilitate the insertion into the boring.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Several embodiments of the invention are explained in greater detail below and are illustrated in the accompanying drawings, in which.

DESCRIPTION OF THE PREFERRED EMBODIMENT

Figure 1:
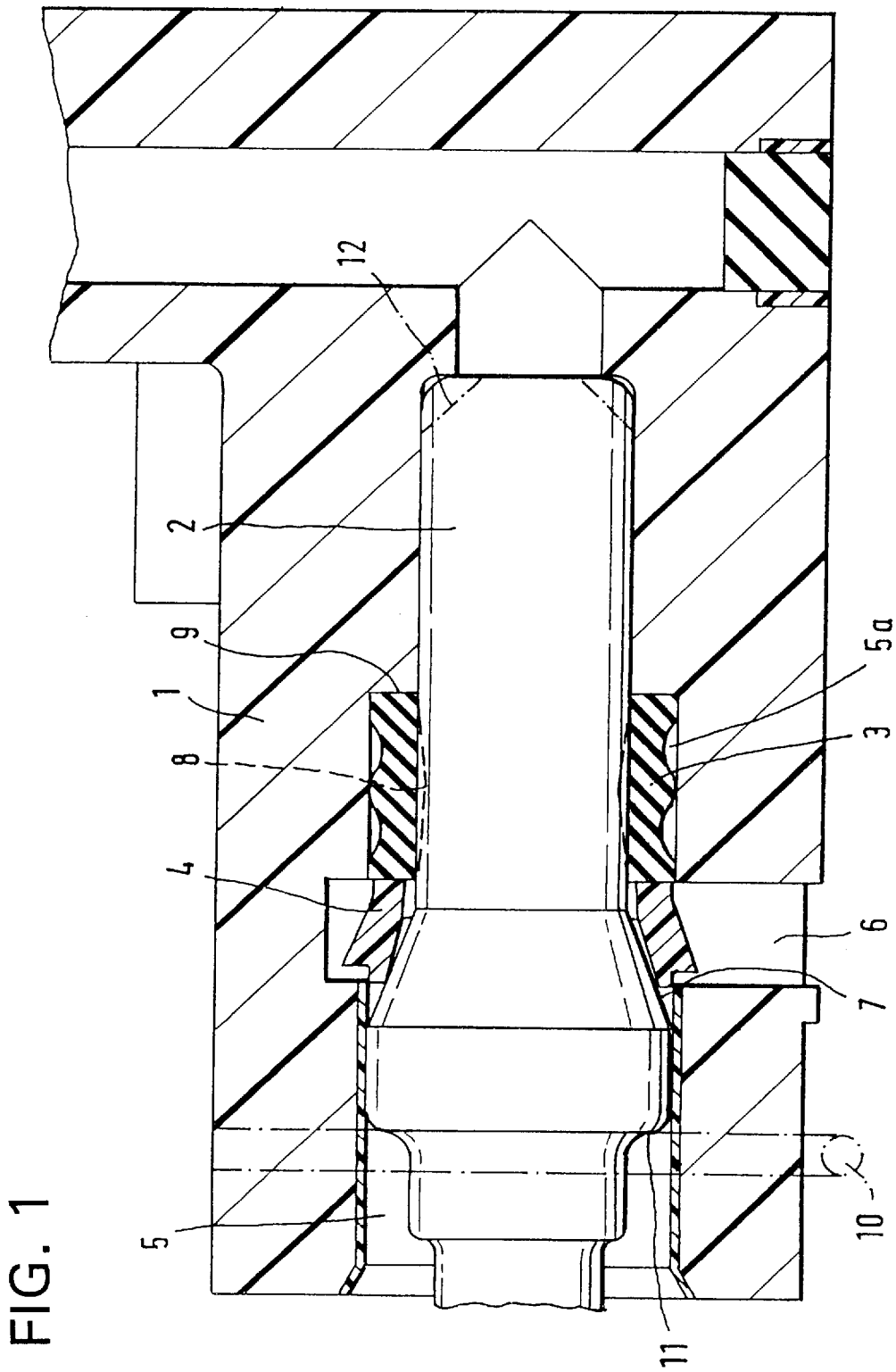
FIG. 1 shows an axial section through a plug-type connector in accordance with the present invention.

FIG. 1 illustrates one embodiment of the plug-type connector in axial section. The outer part 1 has a stepped boring 5, into which an inner part 2 can be inserted. In a forward portion 5a of the stepped boring 5 in the insertion direction, a seal element 3 is in contact against a shoulder 9, which seal element 3 with its outer periphery provides a seal against the wall of the boring 5 in the outer part 1. On the inside diameter, the seal element 3 is tapered toward the center, so that in the area 8 it has its smallest diameter with the highest static bias with respect to the plug or inner part 2. This bias is also transmitted outward, where the actual sealing points of the sealing element 3 are located. The relaxed condition designated 8 of the seal element 3 is illustrated in FIG. 1 by means of a dashed line.

Figure 2:
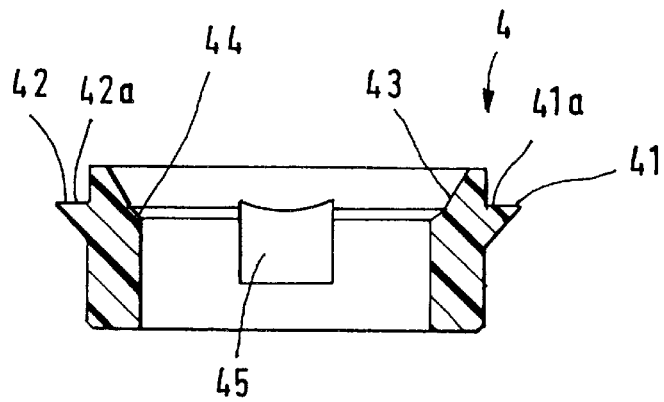
FIG. 2 shows one embodiment of a securing element in axial section.
Figure 2A:
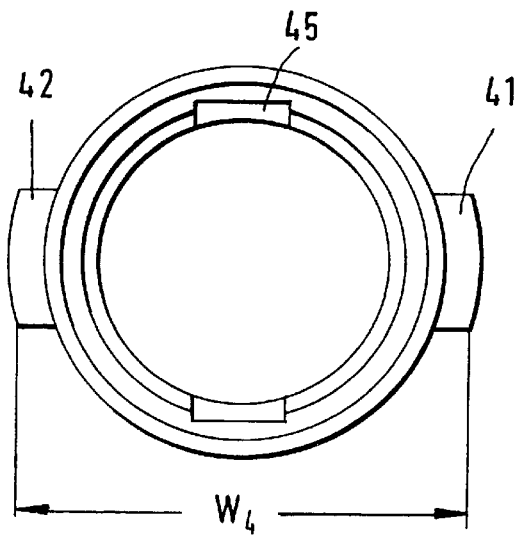
FIG. 2A shows a plan view of the securing element in FIG. 2.
Figure 2B:
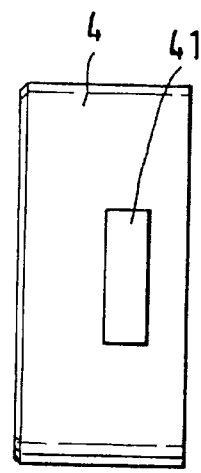
FIG. 2B shows a side view of the securing element in FIG. 2.

The inner part 2 widens in a cone shape, whereby the guidance of the inner part 2 in the stepped boring 5 is performed by means of the forward portion 5a which has the smaller diameter and the rear part with a larger diameter adjacent to the cone 7. Located in front of the seal element 3 is a securing element 4 which is realized in the form of a ring, one embodiment of which is illustrated in FIGS. 2, 2A and 2B.

In the outer part 1 there is a slot 6 which cuts or extends through the boring 5 in front of the seat surface of the sealing element 3. The securing element 4 can preferably be made of plastic, and has two radial hooks or projections 41, 42 located diametrically opposite one another. The radial hooks 41, 42 are provided with axial shoulders 41a, 42a. In the forward area of the securing element 4, the securing element 4 is provided with an inner cone 43 which ends axially approximately at the level of the axial shoulders 41a, 42a and makes a transition into a bevel 44. When the plug-type connector is assembled, the inner cone 43 of the securing element 4 is supported on the outer cone 7 of the inner part 2. The free width W4 between the radial hooks 41, 42 is greater than the larger diameter of the stepped boring 5 in the outer part 1. Recesses 45 can be used to facilitate the installation of the securing element 4, and to position the radial hooks 41, 42 during installation so that the radial hooks 41, 42 will later engage in the slot 6.

Figure 2C:
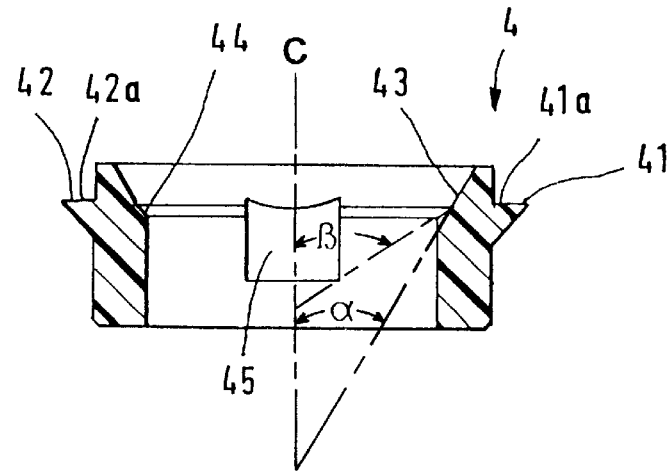
FIG. 2C shows a view similar to FIG. 2, but is more detailed.

In accordance with one embodiment shown in FIG. 2C, the bevel 44 can be disposed at an angle (beta) with respect to a center line C of the securing element 4, and the inner cone 43 can be disposed at an angle (alpha) with respect to center line C. In accordance with one embodiment, the angle of the bevel 44 (beta) can be substantially greater than the angle of the inner cone 43 (alpha). More specifically, the angle of the bevel 44 (beta) can have a value of approximately 55° and the angle of the inner cone 43 (alpha) can have a value of approximately 30°.

When the securing element 4 is inserted into the stepped boring 5, the securing element 4 can be pushed forward. When the securing element 4 with the radial hooks 41, 42 reaches the slot 6, the hooks 41, 42 snap apart and the securing element 4 is locked in the outer part 1. When there is an axial displacement in the opposite direction, the shoulders 41a, 42a run up against the shoulder in the outer part 1 formed by the slot 6. In other words and in accordance with one embodiment, when an axial displacement occurs in the direction opposite of the insertion direction, the shoulders 41a, 42a make contact with a shoulder 6a (see FIG. 1A)

in the outer part 1 which can be formed by the slot 6. The removal of the securing element 4 from the outer part 1 can thereby be prevented.

Figure 6:
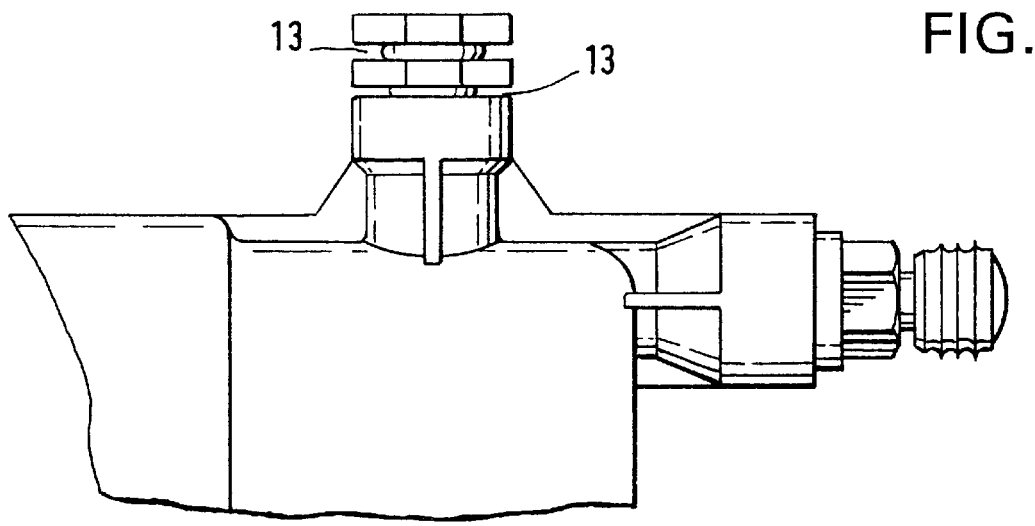
FIG. 6 shows a view of a slave cylinder with a plug-type connector provided on it in one embodiment.

To assemble the plug-type connector, the inner part 2 can be inserted into the stepped boring 5. The cone 43 on the securing ring 4 performs an orientation of the inner part 2 in the boring 5. As the insertion proceeds, the cones 7 and 43 approach one another. The inner part 2 is inserted until it is locked by a securing element 10 which is illustrated in the drawing by dash-dot lines. For this purpose, there can be diametrically oriented slots in the outer part 1, into which slots the securing element 10, which securing element 10 can preferably be realized in the form of a wire clip, can be inserted. One possible embodiment of these slots is illustrated in FIG. 6 discussed further herebelow and also in German Patent No. 44 04 731 discussed hereinabove. The inner part 2 has a shoulder 11 which lies lower than its guide surface, behind which shoulder 11 the securing element 10 is engaged and locks the plug-type connector in position in the boring 5.

When the inner part 2 is extracted from the outer part 1, the sealing element 3 can be pulled along with it only until the shoulders 41a, 42a run up against the shoulder 6a (see FIG. 1A) of the slot 6. The securing element 4 and the sealing element 3 are thereby effectively prevented from falling out of the boring 5. To remove the securing element 4 from the outer part 1, the securing element 4 must either be destroyed, or an attempt must be made to compress it via the slot 6 to the point where the radial hooks 41, 42 are no longer engaged with the slot 6.

To effectively prevent damage to the sealing element 3 during installation of the plug-type connector, the forward portion of the inner part 2, in accordance with one embodiment, can have a diameter which is significantly smaller than the inside diameter of the sealing element 3. The cone 43 of the securing ring 4 should then be realized so that the inner part 2 is introduced into the smaller part 5a of the stepped boring 5 so that the forward part does not come in contact with the sealing element 3. The inside diameter of the securing ring 4 should therefore be selected accordingly. The configuration of the forward end of the inner part 2 is illustrated with dashed lines 12.

In other words, and in accordance with one embodiment, the smallest diameter of the cone portion 43 of securing ring 4 can preferably be similar to the diameter of a portion 2a (see FIG. 1A) of inner part 2 located behind the forward end 12 of the inner part 2. As such, as the inner part 2 is being inserted into boring 5, the cone portion 43 can serve to guide the inner part 2 into the boring 5 so that the tip of the inner part 2 does not damage the sealing element 3. Further, in accordance with one embodiment, the forward end 12 of the inner part 2 can have a frusto-conical shape around its entire circumference as shown in FIG. 1A.

Instead of a slot 6, an encircling ring-shaped groove can be introduced into the outer part 1, if such an introduction is possible from a production engineering point of view. One possible depiction of this type of groove 6b is shown in FIG. 1B. It should be understood that the groove 6b could have many configurations, and as such could have a semi-circular cross-section for example, as compared to the groove 6b shown in FIG. 1B, which groove 6b can have a generally rectangular cross-section.

Figure 3:
FIG. 3 shows an axial section of an additional embodiment of the securing element.
Figure 3A:
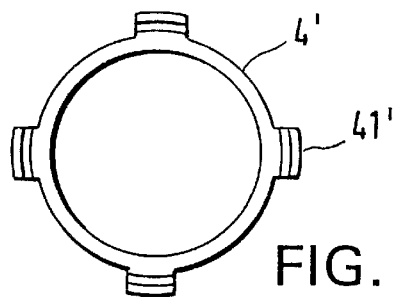
FIG. 3A shows a plan view of the securing element illustrated in FIG. 3.

FIGS. 3 and 3A illustrate an additional embodiment of a securing element 4' which is realized in the shape of a ring, and which has four radial hooks 41' which are offset from one another by about 90 degrees. The securing element 4' can preferably be made of plastic or metal. The securing element 4' can be inserted in the encircling ring-shaped groove 6b described above in the outer part 1, and can then protect and retain the sealing element 3 like the securing element 4 as discussed above. In an outer part 1 without an encircling groove such as groove 6b, a metal component 4' can become stuck in the stepped boring 5.

Figure 1A:
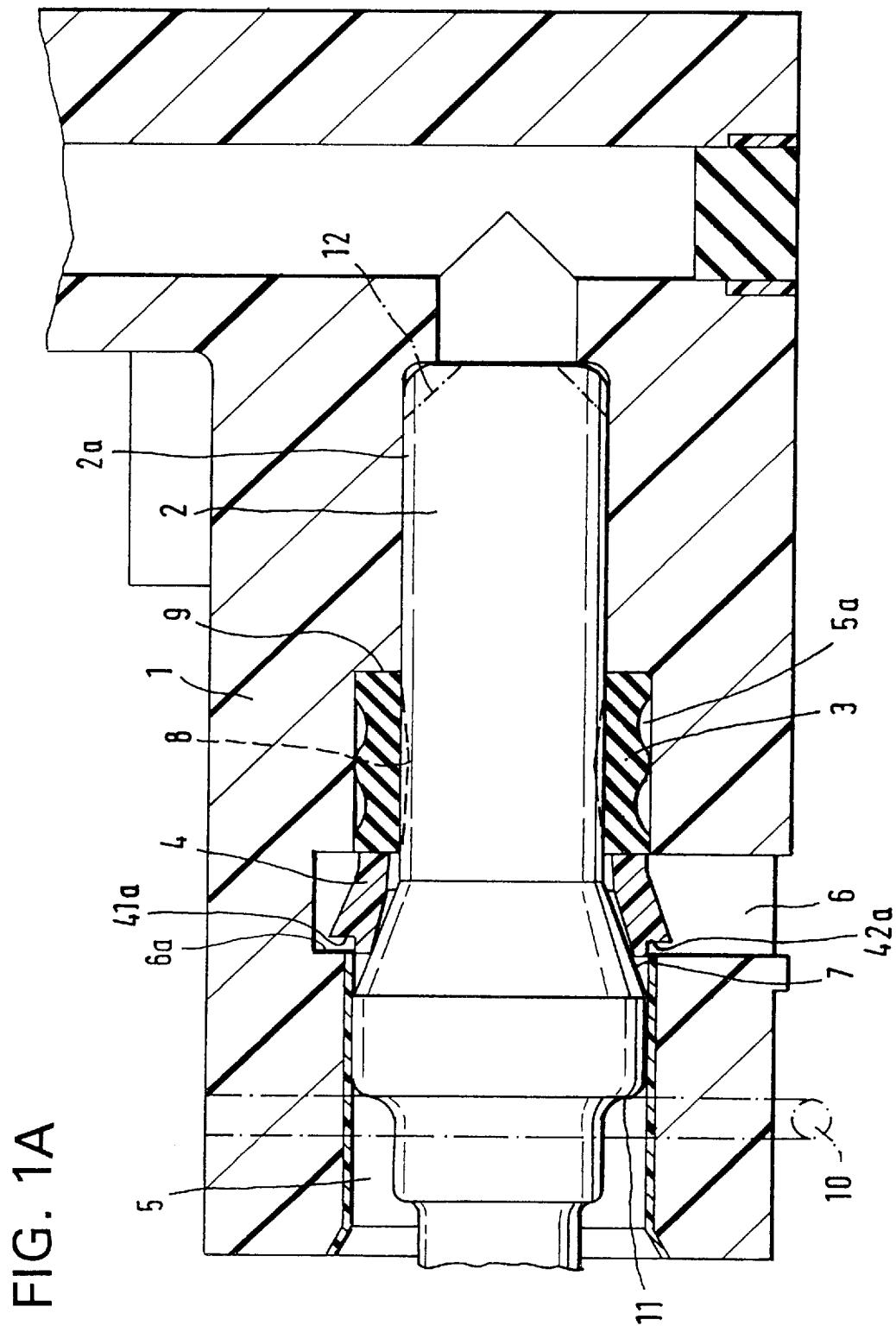
FIG. 1A shows a view similar to FIG. 1 but is more detailed.
Figure 1B:
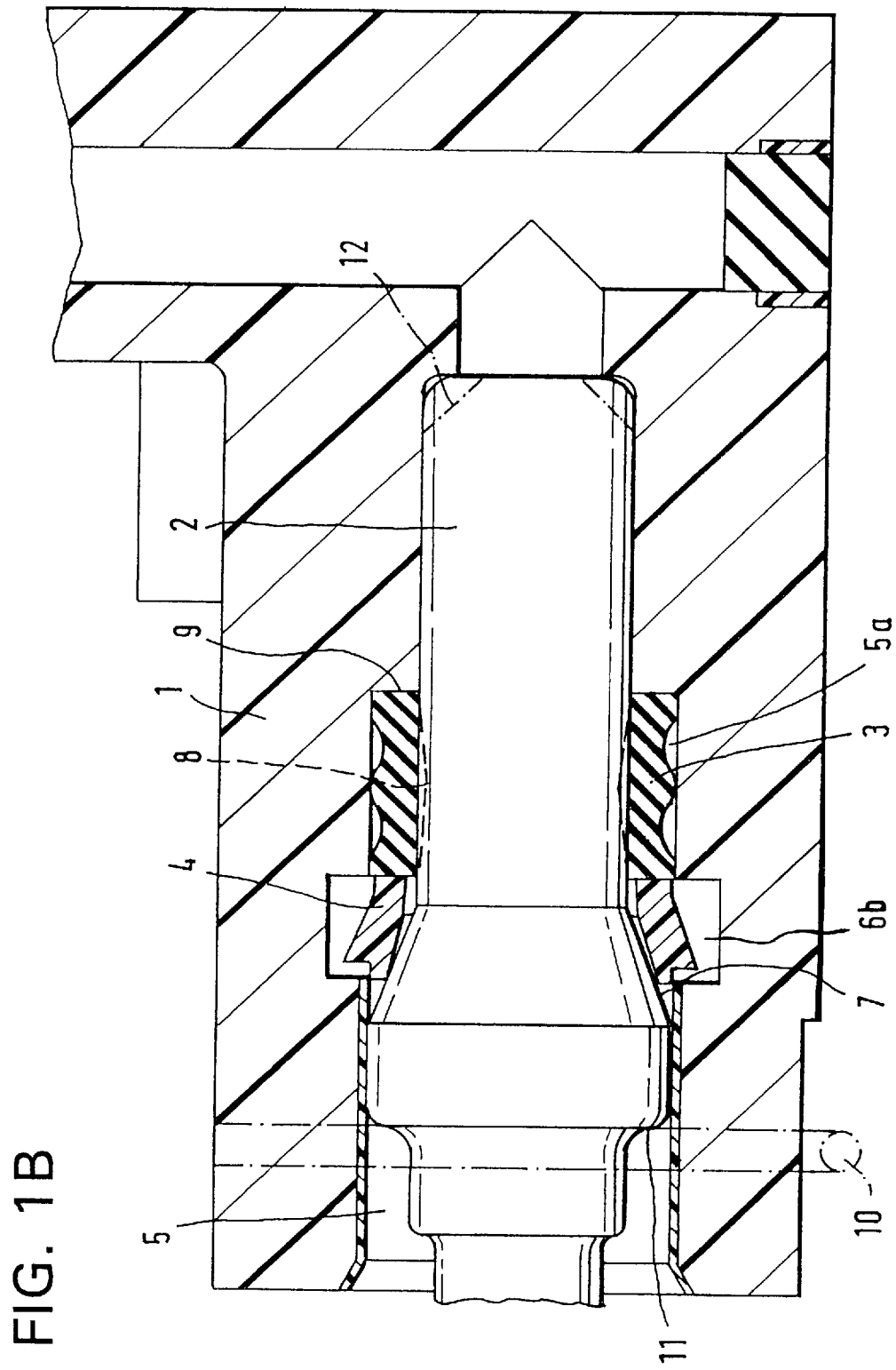
FIG. 1B shows an axial section through an additional embodiment of a plug-type connector.

In accordance with one embodiment, it may instead be possible to utilize the securing element 4', which can be made of metal or plastic, with a slot 6 as shown in FIGS. 1 and 1A.

Figure 3B:
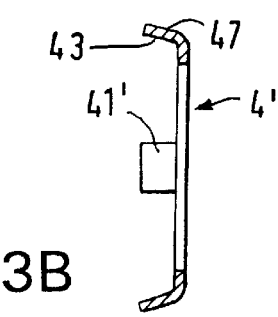
FIG. 3B shows a view similar to FIG. 3, but is more detailed.

In accordance with one embodiment of the present invention shown in FIG. 3B, the securing element 4' can preferably have an inner cone 43 similar to that described above with regard to securing element 4, which cone 43 can be supported on the outer cone 7 of the inner part 2, once the inner part 2 has been inserted into the boring 5. Further, in accordance with one embodiment, the securing element 4' can have an outer cone 47 opposite inner cone 43, which outer cone 47 can aid in inserting the securing element 4' into the boring 5.

Figure 4:
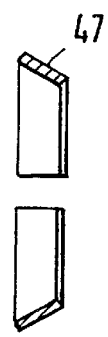
FIG. 4 shows an axial section of an additional embodiment of the securing element.
Figure 4A:
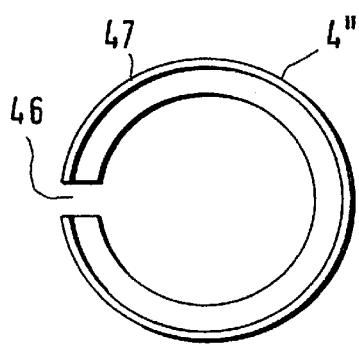
FIG. 4A shows a plan view of the securing element illustrated in FIG. 4.
Figure 4B:
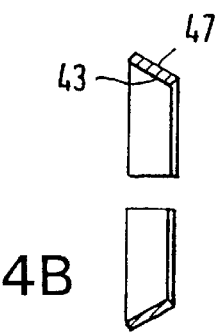
FIG. 4B shows a view similar to FIG. 4, but is more detailed.

Additional embodiments of a securing element 4" and 4''' are illustrated in FIGS. 4, 4A, 5 and 5A. The ring-shaped securing element 4", 4''' can be slotted as shown at 46. The ring 4" can have a cone 47, by means of which the insertion into the stepped boring 5 can be facilitated. In addition, in accordance with one embodiment of the present invention as shown in FIG. 4B, the securing element 4" can also have an inner cone 43, which inner cone 43 can be supported on the outer cone 7 of the inner part 2. As the securing element 4", 4''' is being inserted, the slot 46 makes it possible to compress the ring or securing element 4", 4'''. The components 4" and 4''' can be held in the stepped boring 5 of the outer part 1 without an additional ring-shaped groove 6b or slot 6, simply by their natural tension or prestress. As such, in accordance with one embodiment, radial hooks or projections may not be necessary.

Figure 5:
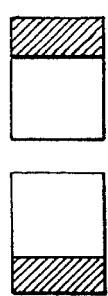
FIG. 5 shows an axial section of an additional embodiment of the securing element.
Figure 5A:
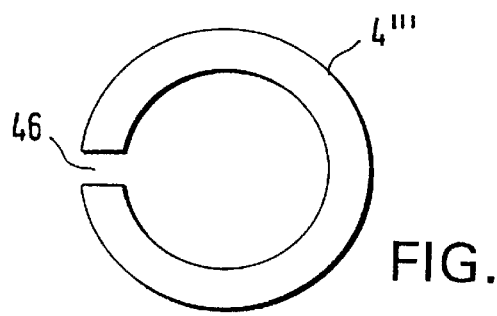
FIG. 5A shows a plan view of the securing element illustrated in FIG. 5.

In accordance with one embodiment of the present invention, the securing element 4''' shown in FIGS. 5 and 5A can differ from the securing element 4, 4', 4" in that the securing element 4''' can be generally cylindrical. That is, the securing element 4''' does not have an inner cone 43 or an outer cone 47.

In accordance with an alternative embodiment of the present invention, it may be possible to insert the securing element 4, 4' into the boring 5 by means of the slot 6. That is, it may be possible or desirable to insert the security element 4, 4' into the boring 5 by pushing the security element 4, 4' into the slot 6.

Figure 7:
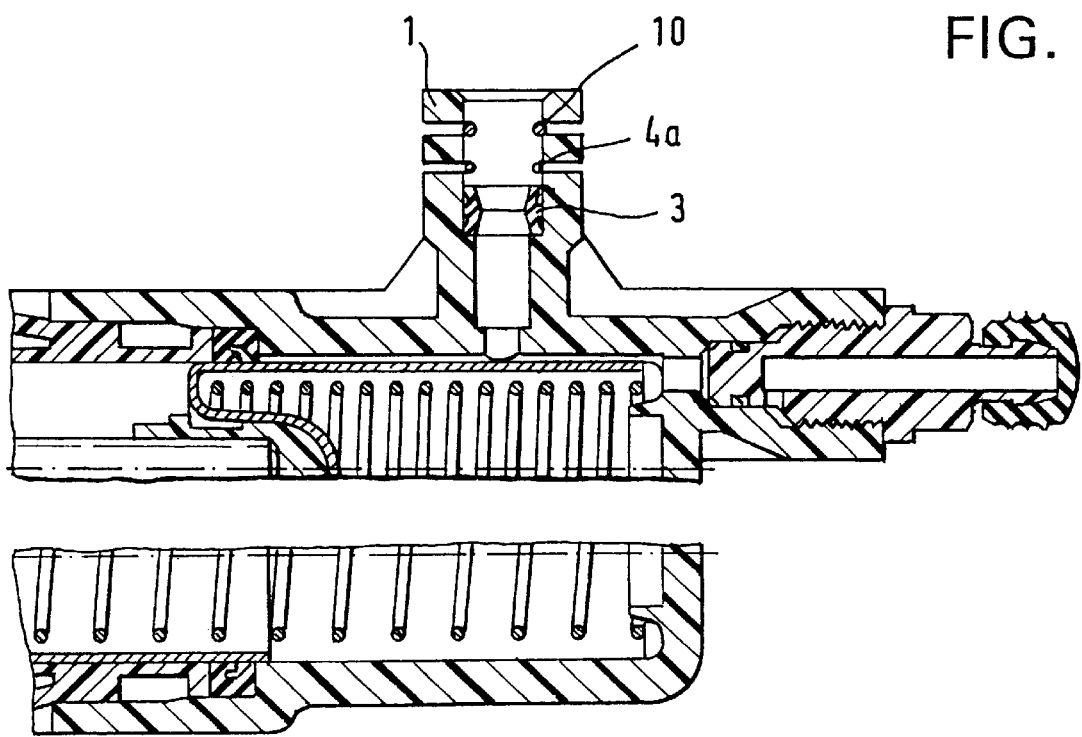
FIG. 7 shows, in axial section, the slave cylinder which is illustrated in FIG. 6.

FIGS. 6 and 7 illustrate the possibility of the realization of an additional embodiment of a securing element 4a for the sealing element 3. As for the securing element 10 which is provided to secure the inner part 2 in boring 5, the outer part 1 has two diametrically oriented slots 13 into which a spring clip 4a analogous to the spring clip 10 can be inserted, and against which the sealing element 3 can come into contact during disassembly.

Figure 6A:
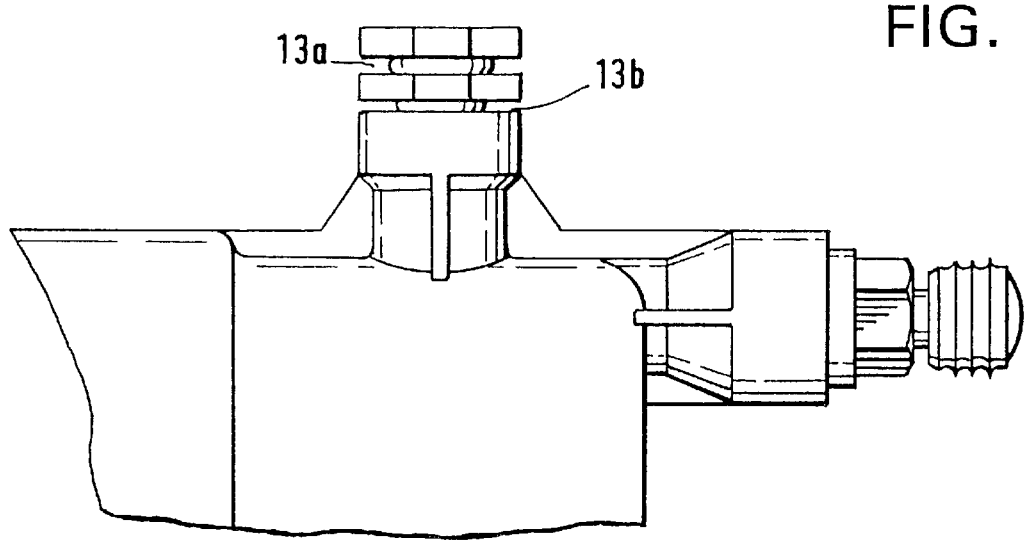
FIG. 6A shows a view similar to FIG. 6, but is more detailed.
Figure 7A:
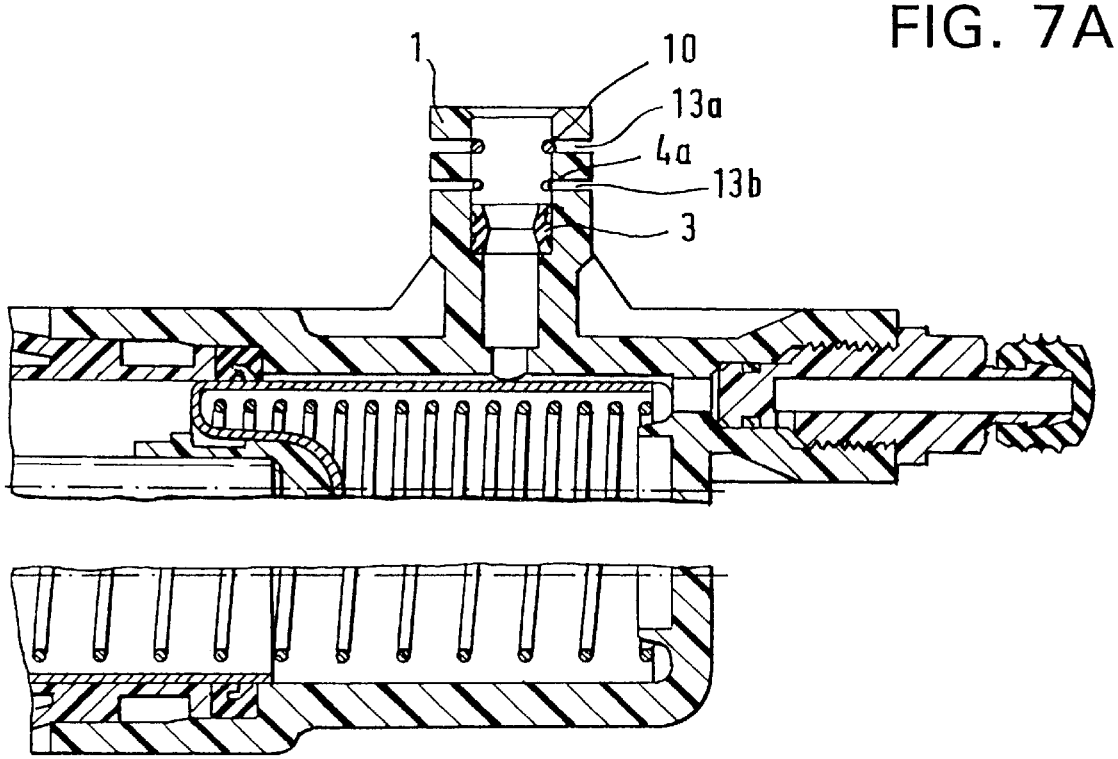
FIG. 7A shows a view similar to FIG. 7, but is more detailed.

In accordance with one embodiment of the present invention as shown in FIGS. 6A and 7A, a securing element 10 can be provided (as also shown in FIGS. 1, 1A, and 1B), to fix the inner part 2 inside boring 5 by means of contact with shoulder 11. A slot 13a can also be provided in the outer part 1 to accommodate the securing element 10. An additional slot 13b can be provided in outer part 1 for accommodating the securing element 4a, which slot 13b can be located adjacent the sealing element 3. Thus, when the inner part 2 is to be removed from the boring 5 of the outer part 1, securing element 10 can be removed from slot 13a, and the securing element 4a can remain in place so that as the inner part 2 is pulled from the boring 5, the sealing element 3 will move out of the boring 5 only until the sealing element 3 makes contact with the securing element 4a, which securing element 4a will stop movement of the sealing element 3 out of the boring 5.

Figure 8:
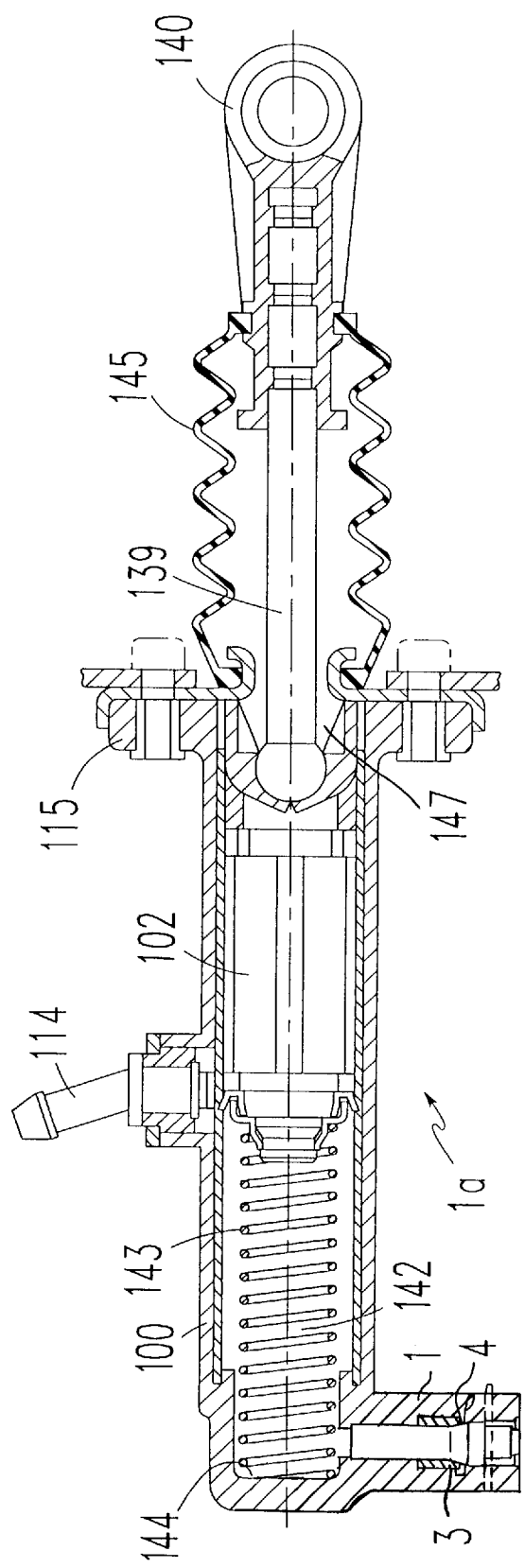
FIG. 8 shows, in cross-section, an additional embodiment of a cylinder for a hydraulic system which incorporates the present invention.

FIG. 8 shows an additional embodiment of one type of a cylinder 1a which utilizes the present invention. The cylinder 1a shown in FIG. 8 can be considered to be a slave cylinder which incorporates the present invention, however, it should be understood that the present invention may be utilized with other types of cylinders such as a master cylinder, for example. The cylinder 1a illustrated in FIG. 8 generally includes a housing 100 and a piston 102. The housing 100 can preferably be provided with a connection in accordance with the present invention for a pressure medium line, a connection 114, and a flange-like fastening connection 115. The piston 102 can preferably be guided within the cylinder 1a so that the piston 102 can move axially, and can be pressurized on its end surface by means of hydraulic fluid.

In accordance with the embodiment shown in FIG. 8, the piston 102 can preferably be attached to a piston rod 139, one end of which piston rod 139 can preferably extend out of cylinder 1a. The end of the piston rod 139 which extends out of the cylinder 1a can preferably be attached to a connecting element 140. The piston 102 can preferably divide the cylinder 1a into an upper working chamber 141 and a lower working chamber 142. The pressure medium line can preferably be used to carry hydraulic medium into the lower working chamber 142, thereby enabling the lower working chamber 142 to be pressurized. In addition, connection 114 can preferably be used as a ventilation line to purge any air in the hydraulic system within the cylinder 1a. In addition to containing the pressure medium, the lower chamber 142 can preferably contain a resilient member 143, such as a spring. The spring 143 can preferably be disposed between the piston 102 and an end wall 144 of the lower chamber 142, and can provide a base pressure for pushing the piston 102 away from the end wall 144. The upper chamber 141 can preferably be closed off by means of a flexible sleeve or boot 145, which boot 145 can surround the piston rod 139 and is capable of moving with the piston rod 139 due to its accordion-like folds, or bellows. The boot 145 can preferably serve to keep dirt away from the piston rod 139.

Figure 9:
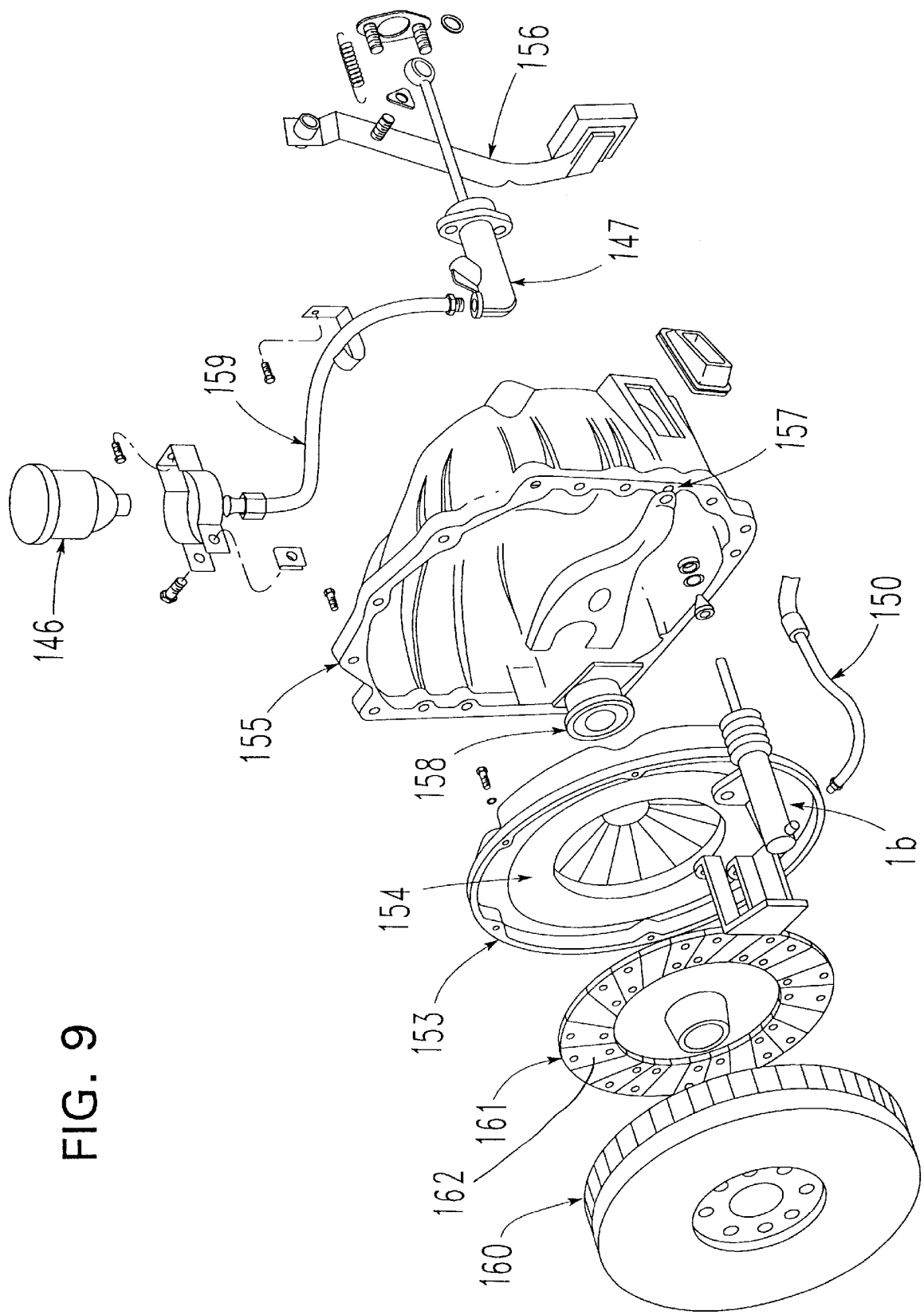
FIG. 9 shows an example of a complete hydraulic clutch assembly.

FIG. 9 shows a hydraulic clutch system in which the present invention can be utilized, which clutch system includes a flywheel 160, a clutch disc 161 having friction linings 162, a clutch cover 153 having a movable pressure plate 154 disposed therein, and a clutch housing 155. In addition, the clutch system can also include a throwout or release bearing 158 and a clutch release fork or throwout lever 157, which release fork 157 can preferably be operatively attached to a slave cylinder 1b. The slave cylinder 1b can preferably be connected, via line 150, to a master cylinder 147, the actual connection of which is not shown here for purposes of simplicity. The master cylinder 147 can preferably be connected to a clutch pedal 156, and to a reservoir 146 by means of line 159.

One feature of the invention resides broadly in the detachable plug-type connector, in particular for the connection of a pressure line to a hydraulic cylinder with a pin-shaped inner part 2 which can be inserted in a boring 5 of an outer part 1, whereby between the outer part 1 and the inner part 2 there is a seal 3, characterized by the fact that the seal 3 sits in the boring 5 of the outer part 1 and in front of the seal 3 there is a securing element 4 which limits the axial travel of the seal 3 in the extraction direction.

Another feature of the invention resides broadly in the plug-type connector characterized by the fact that the seal 3 in the outer part 1 is in contact in the axial direction with a radial shoulder.

Yet another feature of the invention resides broadly in the plug-type connector characterized by the fact that the securing element 4 is a ring which has at least two diametrically oriented radial hooks 41, 42.

Still another feature of the invention resides broadly in the securing element characterized by the fact that the boring 5 has a radial groove into which the radial hooks 41, 42 can be snapped.

A further feature of the invention resides broadly in the plug-type connector characterized by the fact that the outer part 1 is provided with a slot 6 which intersects the boring 5, into which slot 6 the radial hooks 41, 42 can be snapped.

Another feature of the invention resides broadly in the plug-type connector characterized by the fact that the securing element 4' has four radial hooks 41' which are distributed uniformly around the periphery.

Yet another feature of the invention resides broadly in the plug-type connector characterized by the fact that the radial hooks 41, 42, 41' are realized so that they are elastic.

Still another feature of the invention resides broadly in the plug-type connector characterized by the fact that the securing element 4 is provided in front of the radial hooks 41, 42, 41 with an inner cone 43.

A further feature of the invention resides broadly in the plug-type connector characterized by the fact that the inner cone 43 ends axially at the level of the axial shoulder 41a, 42a realized on the radial hooks 41, 42.

Another feature of the invention resides broadly in the plug-type connector characterized by the fact that the securing element 4, 4', 4", 4'" is made of plastic.

Yet another feature of the invention resides broadly in the plug-type connector characterized by the fact that the securing element 4', 4" is a slotted ring.

Still another feature of the invention resides broadly in the plug-type connector characterized by the fact that the securing element 4' has an outer cone 47.

A further feature of the invention resides broadly in the plug-type connector characterized by the fact that the outer part 1 has two slots 13 which extend diametrically in relation to the boring 5, and the securing element 4a is a wire clip or strap which can be inserted into the slots 13.

Some examples of clutch assemblies and various components associated therewith which could possibly utilize the present invention may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch". Some additional examples of hydraulic and/or pneumatic devices which can possibly utilize the piston-cylinder arrangement of the present invention are disclosed by the following U.S. Patents: U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Patents: U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Types of impact dampers for bumpers which could possibly utilize the present invention may be disclosed in the following U.S. Patents: U.S. Pat. No. 4,809,924 to Martens et al., entitled "Hydraulic Bumper"; U.S. Pat. No. 5,096,242 to Chin-Hun, entitled "Shock Absorbing Bumper System"; and U.S. Pat. No. 5,277,462 to Verzelli et al., entitled "High-performance Car Bumper Module".

Types of strut assemblies which could possibly utilize the present invention may be disclosed in the following U.S. Patents: U.S. Pat. No. 4,828,237 to Neff, entitled "Reduced Length MacPherson Strut"; and U.S. Pat. No. 4,861,066 to Dernie, entitled "Vehicle Suspension Strut Systems".

Foreign patent publication applications, namely, Federal Republic of Germany Patent Application No. 44 04 731.2, filed on Feb. 16, 1994, having inventors Wolfgang Grosspietsch, Herbert Voit and Manfred Wehner, and DE-OS 44 04 731.2 and DE-PS 44 04 731.2, are hereby incorporated by reference as if set forth in their entirety herein.

U.S. Pat. application Ser. No. 08/389,012, having inventors Wolfgang Grosspietsch, Herbert Voit and Manfred Wehner, filed on Feb. 15, 1995, is hereby incorporated by reference as if set forth in its entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 196 09 925.0, filed on Mar. 14, 1996, having inventors Wolfgang Grosspietsch, Volker Stampe, Alfred Eusemann, and Thomas Riess, and DE-OS 196 09 925.0 and DE-PS 196 09 925.0 are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A piston-cylinder arrangement for a hydraulic system in a motor vehicle, said piston-cylinder arrangement comprising:

a cylinder, said cylinder having a first end and a second end and defining a chamber therein, at least a portion of said chamber comprising hydraulic fluid therein;

a piston rod extending through said first end of said cylinder and into said chamber;

an arrangement to provide hydraulic fluid into and out of said chamber, said arrangement to provide hydraulic fluid comprising a male fastening device;

said cylinder comprising:

a piston disposed on said piston rod within said chamber, said piston dividing said chamber into at least two chamber portions, said piston being movable within said chamber;

at least one of said at least two chamber portions being configured to contain said hydraulic fluid therein;

an arrangement to connect said arrangement to provide hydraulic fluid to said at least one of said at least two chamber portions containing hydraulic fluid therein;

said arrangement to connect comprising a female fastening device configured for receiving said male fastening device;

said female fastening device comprising a bore disposed in said cylinder;

said male fastening device comprising a tubular portion, said tubular portion being selectively insertable into said bore in a first direction and being selectively removable from said bore in a second direction, said first direction being opposite said second direction;

said cylinder further comprising:

a sealing member disposed in said bore, said sealing member to be disposed about said tubular portion of said male fastening device; and apparatus to retain said sealing member in said bore upon said tubular portion being moved in said second direction;

said female fastening device comprising an outer portion disposed about said bore and defining said bore;

said sealing member being disposed to seal between said outer portion and said tubular portion;

said bore having a longitudinal axis;

said outer portion comprising a shoulder disposed radially with respect to said longitudinal axis of said bore, said shoulder defining a portion of said bore;

said shoulder being in contact with said sealing member;

said apparatus to retain comprising a securing member;

said sealing member having a first end and a second end;

said first end of said sealing member being in contact with said shoulder to limit axial movement of said sealing member upon said tubular member being moved in said first direction;

said second end of said sealing member being in contact with said securing member to limit axial movement of said sealing member upon said tubular member being moved in said second direction;

said securing member comprising a first clip, said first clip comprising a wire clip;

said outer portion of said female fastening device comprising a first slot and a second slot disposed therein;

said first slot and said second slot being disposed substantially perpendicular with respect to said bore, said first slot and said second slot both intersecting said bore;

said first slot being disposed nearer to said sealing member than said second slot;

said first clip being disposed in said first slot;

said tubular portion comprising a first part and a second part, said sealing member to be disposed about said first part; and said cylinder comprising a second clip for being disposed in said second slot, said second clip for contacting said second part of said tubular portion to retain said tubular portion in said bore.

2. The piston-cylinder arrangement according to claim 1, wherein:

said cylinder comprises a housing;

said outer portion of said female fastening device is integral with said housing; and said housing comprises a plastic material.

3. The piston-cylinder arrangement according to claim 2, wherein:

said first part of said tubular portion has a diameter; and said second part of said tubular portion has a diameter, said diameter of said second part being greater than said diameter of said first part.

4. The piston-cylinder arrangement according to claim 1, in combination with a hydraulically operated clutch assembly for a motor vehicle, said clutch assembly comprising:

a clutch disc defining an axis of rotation and an axial direction parallel to the axis of rotation;

a pressure plate to apply an axially directed force to said clutch disc, with respect to said axis of rotation, to engage said clutch disc with a flywheel;

said clutch disc comprising at least one friction lining to contact said pressure plate and a flywheel during engagement of said clutch disc with a flywheel;

an arrangement to hydraulically actuate said clutch disc; and said arrangement to hydraulically actuate comprising:

said piston-cylinder arrangement;

a first arrangement to operatively connect said pressure plate to one of: said cylinder and said piston rod;

a pedal arrangement to apply pressure to the hydraulic fluid within said chamber to operate said pressure plate to apply said axially directed force, at least a portion of said pedal arrangement being disposed in a passenger compartment of a motor vehicle; and a second arrangement to operatively connect said pedal arrangement to the other one of: said cylinder and said piston rod.

5. A piston-cylinder arrangement for a hydraulic system in a motor vehicle, said piston-cylinder arrangement comprising:

a cylinder, said cylinder having a first end and a second end and defining a chamber therein, at least a portion of said chamber comprising hydraulic fluid therein;

a piston rod extending through said first end of said cylinder and into said chamber;

an arrangement to provide hydraulic fluid into and out of said chamber, said arrangement to provide hydraulic fluid comprising a male fastening device;

said cylinder comprising:

a piston disposed on said piston rod within said chamber, said piston dividing said chamber into at least two chamber portions, said piston being movable within said chamber;

at least one of said at least two chamber portions being configured to contain said hydraulic fluid therein;

an arrangement to connect said arrangement to provide hydraulic fluid to said at least one of said at least two chamber portions containing hydraulic fluid therein;

said arrangement to connect comprising a female fastening device configured for receiving said male fastening device;

said female fastening device comprising a bore disposed in said cylinder;

said male fastening device comprising a tubular portion, said tubular portion being selectively insertable into said bore in a first direction and being selectively removable from said bore in a second direction, said first direction being opposite said second direction;

said cylinder further comprising:

a sealing member disposed in said bore, said sealing member to be disposed about said tubular portion of said male fastening device; and apparatus to retain said sealing member in said bore upon said tubular portion being moved in said second direction;

said female fastening device comprising an outer portion disposed about said bore and defining said bore;

said sealing member being disposed to seal between said outer portion and said tubular portion;

said bore having a longitudinal axis;

said outer portion comprising a shoulder disposed radially with respect to said longitudinal axis of said bore, said shoulder defining a portion of said bore;

said shoulder being in contact with said sealing member;

said apparatus to retain comprising a securing member;

said sealing member having a first end and a second end;

said first end of said sealing member being in contact with said shoulder to limit axial movement of said sealing member upon said tubular member being moved in said first direction;

said second end of said sealing member being in contact with said securing member to limit axial movement of said sealing member upon said tubular member being moved in said second direction;

said tubular portion comprises a first part and a second part, said sealing member to be disposed about said first part;

said second part being disposed immediately adjacent said securing member;

said second part comprising a conical portion;

said tubular portion comprising a third part disposed adjacent said second part;

said outer portion comprising a slot disposed therein, said slot of said outer portion being disposed substantially perpendicular to said bore;

said cylinder comprising a clip for being disposed in said slot of said outer portion, said clip for contacting said third part of said tubular portion to retain said tubular portion within said bore;

said tubular portion comprising a tip disposed adjacent said first part, said tip being tapered to assist in insertion of said tubular portion into said bore;

said securing member comprising a ring-shaped element;

said ring-shaped element having a slot extending therethrough to permit said ring-shaped element to be compressed to aid in insertion of said ring-shaped element into said bore;

said ring-shaped element having an outer surface and an inner surface facing away from one another;

said ring-shaped element comprising one of a) and b):
  a) a first conical surface being disposed at said outer surface of said ring-shaped element, said first conical surface being disposed at a substantial angle with respect to said longitudinal axis of said bore, said first conical surface being configured and disposed to aid in insertion of said ring-shaped element into said bore;
  a second conical surface disposed at said inner surface of said ring-shaped element opposite said first conical surface, said second conical surface being engageable with said conical portion of said tubular portion; and
  b) a generally cylindrical shape.

6. The piston-cylinder arrangement according to claim 5, wherein:

said cylinder comprises a housing;

said outer portion of said female fastening device is integral with said housing; and said housing comprises a plastic material.

7. The piston-cylinder arrangement according to claim 6, wherein:

said ring-shaped element comprising one of: a plastic material and a metal material;

said third part of said tubular portion has a diameter; and said first part of said tubular portion has a diameter, said diameter of said third part being greater than said diameter of said first part.

8. The piston-cylinder arrangement according to claim 5, in combination with a hydraulically operated clutch assembly for a motor vehicle, said clutch assembly comprising:

a clutch disc defining an axis of rotation and an axial direction parallel to the axis of rotation;

a pressure plate to apply an axially directed force to said clutch disc, with respect to said axis of rotation, to engage said clutch disc with a flywheel;

said clutch disc comprising at least one friction lining to contact said pressure plate and a flywheel during engagement of said clutch disc with a flywheel;

an arrangement to hydraulically actuate said clutch disc; and said arrangement to hydraulically actuate comprising:
  said piston-cylinder arrangement;
  a first arrangement to operatively connect said pressure plate to one of: said cylinder and said piston rod;
  a pedal arrangement to apply pressure to the hydraulic fluid within said chamber to operate said pressure plate to apply said axially directed force, at least a portion of said pedal arrangement being disposed in a passenger compartment of a motor vehicle; and
  a second arrangement to operatively connect said pedal arrangement to the other one of: said cylinder and said piston rod.

9. A piston-cylinder arrangement for a hydraulic system in a motor vehicle, said piston-cylinder arrangement comprising:

a cylinder, said cylinder having a first end and a second end and defining a chamber therein, at least a portion of said chamber comprising hydraulic fluid therein;

a piston rod extending through said first end of said cylinder and into said chamber;

an arrangement to provide hydraulic fluid into and out of said chamber, said arrangement to provide hydraulic fluid comprising a male fastening device;

said cylinder comprising:
  a piston disposed on said piston rod within said chamber, said piston dividing said chamber into at least two chamber portions, said piston being movable within said chamber;
  at least one of said at least two chamber portions being configured to contain said hydraulic fluid therein;
  an arrangement to connect said arrangement to provide hydraulic fluid to said at least one of said at least two chamber portions containing hydraulic fluid therein;
  said arrangement to connect comprising a female fastening device configured for receiving said male fastening device;
  said female fastening device comprising a bore disposed in said cylinder;

said male fastening device comprising a tubular portion, said tubular portion being selectively insertable into said bore in a first direction and being selectively removable from said bore in a second direction, said first direction being opposite said second direction;

said cylinder further comprising:
  a sealing member disposed in said bore, said sealing member to be disposed about said tubular portion of said male fastening device;
  apparatus to retain said sealing member in said bore upon said tubular portion being moved in said second direction;

said female fastening device comprising an outer portion disposed about said bore and defining said bore;

said sealing member being disposed to seal between said outer portion and said tubular portion;

said bore having a longitudinal axis;

said outer portion comprising a shoulder disposed radially with respect to said longitudinal axis of said bore, said shoulder defining a portion of said bore;

said shoulder being in contact with said sealing member;

said apparatus to retain comprising a securing member;

said sealing member having a first end and a second end;

said first end of said sealing member being in contact with said shoulder to limit axial movement of said sealing member upon said tubular member being moved in said first direction;

said second end of said sealing member being in contact with said securing member to limit axial movement of said sealing member upon said tubular member being moved in said second direction;

said securing member comprising a ring having at least two projections extending in a generally radial direction with respect to said longitudinal axis of said bore, said at least two projections each comprising a deformable material;

said outer portion of said female fastening device comprising an arrangement to receive said at least two projections of said ring, said arrangement to receive being disposed adjacent said second end of said sealing member;

said outer portion of said female fastening device comprising an outer surface and an inner surface facing away from one another, said inner surface defining said bore;

said arrangement to receive comprising one of a) and b):
 a) a groove extending radially into said inner surface of said female fastening device, said at least two projections being engaged in said groove to limit axial movement of said sealing member upon said tubular portion being moved in said second direction; and
 b) a slot extending radially from at least a portion of said outer surface of said outer portion towards said bore, said slot intersecting said bore, said at least two projections being engaged in said slot to limit axial movement of said sealing member upon said tubular portion being moved in said second direction;

said ring having an inner periphery and an outer periphery, said at least two projections extending from said outer periphery;

said ring comprising a conical surface disposed adjacent said inner periphery of said ring, said conical surface being disposed at a substantial angle with respect to said longitudinal axis of said bore;

said tubular portion of said male fastening device comprising:
 a first part and a second part, said sealing member to be disposed about said first part;
 said second part being disposed adjacent said arrangement to receive, said second part comprising a conical portion to be engaged with said conical surface of said ring;

said ring having an inner surface and an outer surface facing away from one another, said inner surface comprising said inner periphery and said outer surface comprising said outer periphery;

said ring having a first end and a second end, said first end being disposed adjacent said second end of said sealing member;

said inner surface of said ring comprising:
 said conical surface, said conical surface being disposed immediately adjacent said second end of said ring;
 a substantially cylindrical surface disposed adjacent said first end of said ring;
 a beveled surface, said beveled surface being disposed between said conical surface and said substantially cylindrical surface;
 said beveled surface being disposed at a substantial angle with respect to said longitudinal axis of said bore, said substantial angle of said beveled surface being substantially greater than said substantial angle of said conical surface with respect to said bore;

said beveled surface and said conical surface adjoining one another at an area on said inner surface;

said at least two projections comprising a first projection and a second projection disposed about 180° from one another on said outer surface of said ring;

said first projection and said second projection each comprising a radial surface, said radial surfaces of each of said first projection and said second projection engage with said arrangement to receive upon movement of said tubular portion in said second direction;

each of said radial surfaces of each of said first projection and said second projection being disposed on said outer surface of said ring at a position corresponding axially to said area on said inner surface wherein said beveled surface and said conical surface adjoin one another;

said ring further comprising a first recess and a second recess extending radially into said inner surface of said ring, said recesses being disposed and configured to assist in positioning said first projection and said second projection in said arrangement to receive;

said first recess and said second recess being disposed at about 180° from one another along said inner surface of said ring;

said first recess and said second recess each being disposed about 90° from an adjacent one of said first projection and said second projection;

said sealing element comprising an inner portion and an outer portion facing away from one another;

said inner portion comprising a projecting portion, said projecting portion extending radially towards said tubular portion and contacting said tubular portion;

said tubular portion comprising a third part disposed adjacent said second part;

said outer portion comprising a slot disposed therein, said slot of said outer portion being disposed substantially perpendicular to said bore;

said cylinder comprising a clip for being disposed in said slot of said outer portion, said clip for contacting said third part of said tubular portion to retain said tubular portion in said bore; and said tubular portion comprising a tip disposed adjacent said first part of said tubular portion, said tip being tapered to assist in insertion of said tubular portion into said bore.

10. The piston-cylinder arrangement according to claim 9, wherein:

said cylinder comprises a housing;

said outer portion of said female fastening device is integral with said housing; and said housing comprises a plastic material.

11. The piston-cylinder arrangement according to claim 10, wherein:

said third part of said tubular portion has a diameter;

said first part of said tubular portion has a diameter, said diameter of said third part being greater than said diameter of said first part; and said ring comprising a plastic material.

12. The piston-cylinder arrangement according to claim 9, in combination with a hydraulically operated clutch assembly for a motor vehicle, said clutch assembly comprising:

a clutch disc defining an axis of rotation and an axial direction parallel to the axis of rotation;

a pressure plate to apply an axially directed force to said clutch disc, with respect to said axis of rotation, to engage said clutch disc with a flywheel;

said clutch disc comprising at least one friction lining to contact said pressure plate and a flywheel during engagement of said clutch disc with a flywheel;

an arrangement to hydraulically actuate said clutch disc; and said arrangement to hydraulically actuate comprising:
said piston-cylinder arrangement;
a first arrangement to operatively connect said pressure plate to one of: said cylinder and said piston rod;
a pedal arrangement to apply pressure to the hydraulic fluid within said chamber to operate said pressure plate to apply said axially directed force, at least a portion of said pedal arrangement being disposed in a passenger compartment of a motor vehicle; and
a second arrangement to operatively connect said pedal arrangement to the other one of: said cylinder and said piston rod.

13. A piston-cylinder arrangement for a hydraulic system in a motor vehicle, said piston-cylinder arrangement comprising:

a cylinder, said cylinder having a first end and a second end and defining a chamber therein, at least a portion of said chamber comprising hydraulic fluid therein;

a piston rod extending through said first end of said cylinder and into said chamber;

an arrangement to provide hydraulic fluid into and out of said chamber, said arrangement to provide hydraulic fluid comprising a male fastening device;

said cylinder comprising:
a piston disposed on said piston rod within said chamber, said piston dividing said chamber into at least two chamber portions, said piston being movable within said chamber;
at least one of said at least two chamber portions being configured to contain said hydraulic fluid therein;
an arrangement to connect said arrangement to provide hydraulic fluid to said at least one of said at least two chamber portions containing hydraulic fluid therein;
said arrangement to connect comprising a female fastening device configured for receiving said male fastening device;
said female fastening device comprising a bore disposed in said cylinder;

said male fastening device comprising a tubular portion, said tubular portion being selectively insertable into said bore in a first direction and being selectively removable from said bore in a second direction, said first direction being opposite said second direction;

said cylinder further comprising:
a sealing member disposed in said bore, said sealing member to be disposed about said tubular portion of said male fastening device;
apparatus to retain said sealing member in said bore upon said tubular portion being moved in said second direction;

said female fastening device comprising an outer portion disposed about said bore and defining said bore;

said sealing member being disposed to seal between said outer portion and said tubular portion;

said bore having a longitudinal axis;

said outer portion comprising a shoulder disposed radially with respect to said longitudinal axis of said bore, said shoulder defining a portion of said bore;

said shoulder being in contact with said sealing member;

said apparatus to retain comprising a securing member;

said sealing member having a first end and a second end;

said first end of said sealing member being in contact with said shoulder to limit axial movement of said sealing member upon said tubular member being moved in said first direction;

said second end of said sealing member being in contact with said securing member to limit axial movement of said sealing member upon said tubular member being moved in said second direction;

said securing member comprising a ring having at least two projections extending in a generally radial direction with respect to said longitudinal axis of said bore, said at least two projections each comprising a deformable material;

said outer portion of said female fastening device comprising an arrangement to receive said at least two projections of said ring, said arrangement to receive being disposed adjacent said second end of said sealing member;

said outer portion of said female fastening device comprising an outer surface and an inner surface facing away from one another, said inner surface defining said bore;

said arrangement to receive comprising one of a) and b):
a) a groove extending radially into said inner surface of said female fastening device, said at least two projections being engaged in said groove to limit axial movement of said sealing member upon said tubular portion being moved in said second direction; and
b) a slot extending radially from at least a portion of said outer surface of said outer portion towards said bore, said slot intersecting said bore, said at least two projections being engaged in said slot to limit axial movement of said sealing member upon said tubular portion being moved in said second direction;

said ring having an inner periphery and an outer periphery, said at least two projections extending from said outer periphery;

said ring comprising a conical surface disposed adjacent said inner periphery of said ring, said conical surface being disposed at a substantial angle with respect to said longitudinal axis of said bore;

said tubular portion of said male fastening device comprising:
a first part and a second part, said sealing member to be disposed about said first part;
said second part being disposed adjacent said arrangement to receive, said second part comprising a conical portion to be engaged with said conical surface of said ring;

said at least two projections comprising four projections disposed about 90° from one another about said outer periphery of said ring;

said four projections each having an outer surface disposed at a substantial angle with respect to said longitudinal axis of said bore to assist in insertion of said ring into said bore;

said tubular portion comprising a third part disposed adjacent said second part;

said outer portion comprising a slot disposed therein, said slot of said outer portion being substantially perpendicular to said bore;

said cylinder comprising a clip for being disposed in said slot of said outer portion, said clip for contacting said third part to retain said tubular portion in said bore; and said tubular portion comprising a tip disposed adjacent said first part, said tip being tapered to assist in insertion of said tubular portion into said bore.

14. The piston-cylinder arrangement according to claim 13, wherein:

said cylinder comprises a housing;

said outer portion of said female fastening device is integral with said housing; and said housing comprises a plastic material.

15. The piston-cylinder arrangement according to claim 14, wherein:

said third part having a diameter;

said first part of said tubular portion having a diameter, said diameter of said third part being greater than said diameter of said first part; and said ring comprising one of: a plastic material and a metal material.

16. The piston-cylinder arrangement according to claim 13, in combination with a hydraulically operated clutch assembly for a motor vehicle, said clutch assembly comprising:

a clutch disc defining an axis of rotation and an axial direction parallel to the axis of rotation;

a pressure plate to apply an axially directed force to said clutch disc, with respect to said axis of rotation, to engage said clutch disc with a flywheel;

said clutch disc comprising at least one friction lining to contact said pressure plate and a flywheel during engagement of said clutch disc with a flywheel;

an arrangement to hydraulically actuate said clutch disc; and said arrangement to hydraulically actuate comprising:

said piston-cylinder arrangement;

a first arrangement to operatively connect said pressure plate to one of: said cylinder and said piston rod;

a pedal arrangement to apply pressure to the hydraulic fluid within said chamber to operate said pressure plate to apply said axially directed force, at least a portion of said pedal arrangement being disposed in a passenger compartment of a motor vehicle; and a second arrangement to operatively connect said pedal arrangement to the other one of: said cylinder and said piston rod.

* * * * *

UNITED STATES PATENT AND TRADEMARK OFFICE
CERTIFICATE OF CORRECTION

PATENT NO. : 5,860,502
DATED : January 19, 1999
INVENTOR(S) : Wolfgang GROSSPIETSCH, Volker STAMPF, Alfred EUSEMANN and Thomas RIESS It is certified that error appears in the above-identified patent and that said Letters Patent is hereby corrected as shown below:

Column 8, line 32, before "with", delete "41" and substitute therefor --41'--.

Signed and Sealed this

Seventh Day of September, 1999

Attest:

Q. TODD DICKINSON

*Attesting Officer*  *Acting Commissioner of Patents and Trademarks*